May 21, 1968     K. W. LUNDVALL     3,384,274
ULTRAHIGH PRESSURE GREASE GUN
Filed June 7, 1966
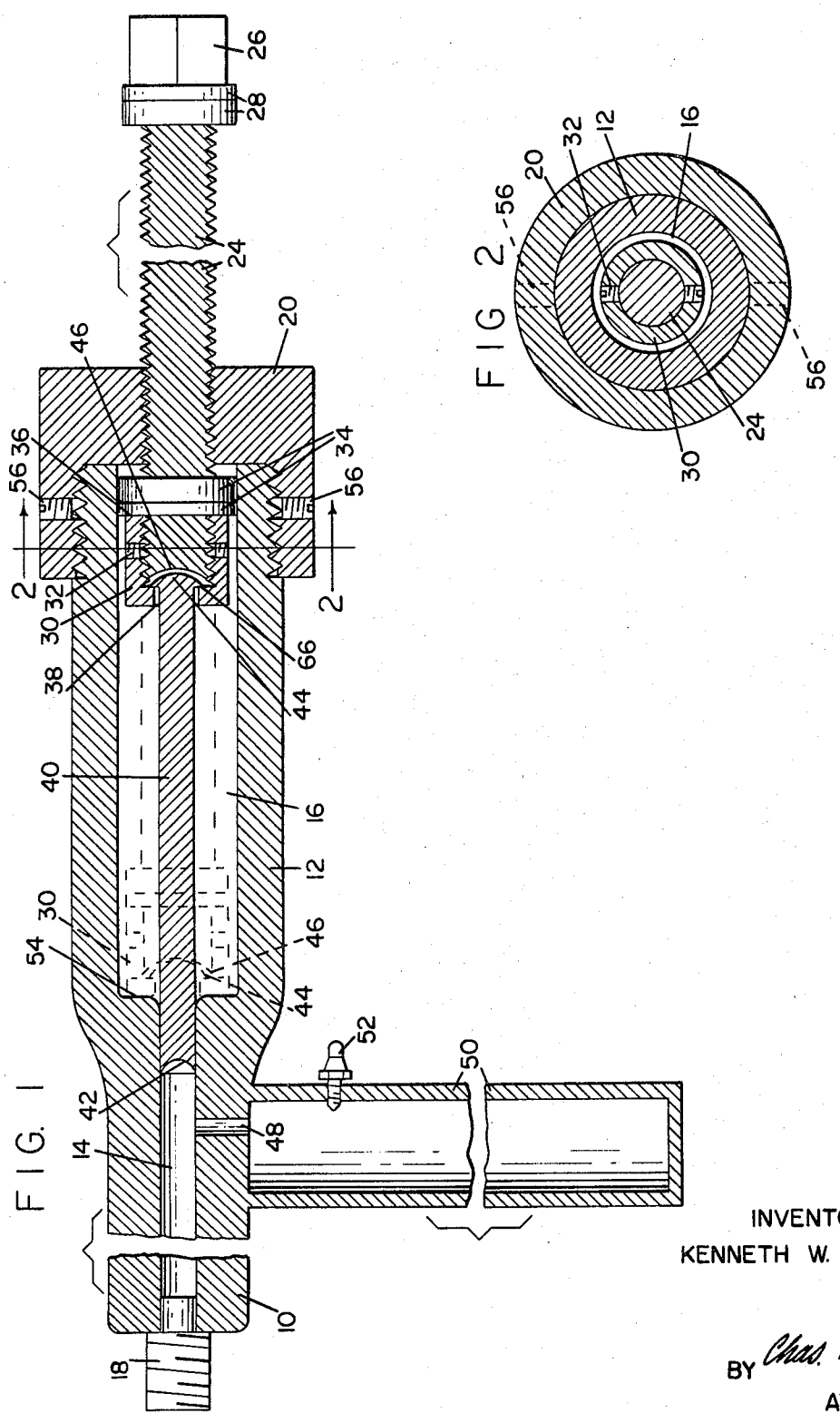
INVENTOR
KENNETH W. LUNDVALL
BY *Chas. R. Fay*,
ATTORNEY

United States Patent Office

3,384,274
Patented May 21, 1968

3,384,274
ULTRAHIGH PRESSURE GREASE GUN
Kenneth W. Lundvall, R.R. 1, Box 352A, Bates St.,
Mendon, Mass. 01756
Filed June 7, 1966, Ser. No. 555,811
1 Claim. (Cl. 222—383)

This invention relates to a new and improved high pressure grease gun and it is referred to herein as "ultra" high pressure due to the fact that it is adapted to be operated by a power operated wrench.

This gun is used in place of the following present methods for greasing blocked or frozen grease fittings and bearing surfaces: 1, hammering or pounding the faulty joint while a conventional pressure grease gun maintains pressure on the fitting, and 2, the use of a torch to heat the faulty joint and then use the conventional pressure grease gun. This is extremetly dangerous because of the chance of the grease catching fire.

The principal object of the invention resides in the provision of a grease gun of the type described which has an elongated barrel containing two axially aligned communicating chambers of unequal diameters, in the larger chamber of which there is a screw-threaded rod projecting out of the barrel at one end for application of the power tool thereto to turn the same, advancing the screw-threaded rod through the larger chamber; the smaller chamber having a plunger therein for the ejection of grease thereby under pressure of the advancing screw-threaded rod, the difference in diameters of the two chambers resulting in ease of operation and excess pressure applied to the plunger, so that stubborn greasing jobs particularly in the automotive field can be more easily serviced and frozen grease ejected from the bearings and fittings, etc. which are desired to be greased.

Another object of the invention resides in the provision of a handle that serves as a magazine for the grease which has a relatively small passage into the smaller chamber and also has a grease fitting thereon for the pressurized ejection of grease from the magazine into the smaller chamber when the plunger is retracted, under any conventional means found in the usual grease supply for automotive purposes, etc. which is used to supply the magazine also.

In addition the invention contemplates other improvements such as a concave tip on the plunger for cupping the grease and eliminating the need for a washer; a coupling between the plunger and the screw-threaded rod for disconnecting one from the other in case of need; a self-centering connection in the coupling which acts like a ball and socket; which allows the plunger to turn with the rod, but if the plunger, for some reason, should bind and stop turning, the ball and socket joint will allow the rod to continue to turn, thus preventing any damage or breakage to either the plunger or the rod; and the provision of washers in certain specified locations to protect parts of the device, it being remembered that this device is adapted to be acted upon by a power tool which provides an extremely powerful impact.

The invention further relates to arrangements and combinations of parts which will be hereinafter described and more particularly set forth in the appended claims.

Reference is to be had to the accompanying drawings in which:

FIG. 1 is a cross sectional view illustrating the invention, and

FIG. 2 is a section on line 2—2 of FIG. 1.

In disclosing the present invention, the same is shown as comprising essentially an elongated barrel. This barrel has a relatively restricted portion 10 and an enlarged portion 12, the restricted portion 10 having a relatively narrow but elongated chamber 14 therein and the enlarged portion 12 having a relatively larger chamber 16. Both of the chambers are open-ended, there being a thread 18 at the open end of the smaller portion of the barrel for the purpose of applying the same to a conventional grease fitting or the like. At the open end of the larger portion of the barrel there is a fitting or cup 20 which may be threaded onto the end of the barrel as shown and which is provided with internal threads at 22 for threaded reception of a relatively large diameter elongated threaded rod 24. Fitting 20 is secured to member 12 by screws 56 which prevent any relative motion of these parts.

Rod 24 is provided with a head 26 for the reception of the power wrench and under this head there is provided a rubber washer arrangement 28 for a purpose to be described. At its inner end the threaded rod is threaded into a cup-like member 30 and pinned or secured thereto as by screws 32 which prevent cup 30 from unscrewing. There is a rubber washer arrangement 34 on the threaded rod 24 at this end also adjacent the rim or edge 36 of cup 30. Cup 30 is open at its central portion at the opposite end thereof from the washers 34 as at 38 and a plunger 40 extends therefrom.

Plunger 40 is seen to be relatively small in diameter to slidingly fit the passage at 14. It has a forward cupped end 42 which tends to gather the grease and prevent it from getting inbetween the walls of chamber 14 and rod 40 and obviates the necessity of a washer at this end. At its other end it terminates in a rounded enlarged head 44 which has a peripheral shoulder 66 larger than the opening at 38 in the cup 30 so that the cup retracts the plunger when the screw-threaded rod is turned in one direction. In the other direction, the screw-threaded rod will cause the plunger to move to the left expressing the grease through the fitting 18.

The free end of the screw-threaded rod is rounded concavely at 46 and it will be seen that when it impinges on the head 44 a ball joint type of device is provided which is self-centering as to plunger 40.

The smaller portion of the barrel has a relatively small inlet passage at 48 through which grease from the magazine 50 is forced under pressure by means of the air pressure of the usual grease supply applied through a fitting 52. Fitting 52 is conventional and so is the grease supply, but it will be seen that by this means grease under pressure may be provided into the chamber 14 whenever the plunger 40 is in its retracted position.

It will be seen that this invention provides an extremely powerful grease gun which is easily handled because the magazine 50 provides a handle for one hand and the power tool applied to the nut 26 forms the other handle. The power tool in the form of an impact wrench for instance turns nut 26 and advances and retracts rod 24, which in turn operates the plunger 40.

When the retracting stroke is completed, the washers 34 serve to cushion the shock on the inside of the fitting 20, and when the plunger has reached its extreme left-hand position, the washers 28 provide the same service at the exterior thereof and also prevent cup 30 from hitting surface 54. These washers 28 and 34 therefore limit the extent of operation of the screw-threaded rod and therefore the plunger in both directions. In the direction toward the left, washers 28 strike the exterior surface of fitting 20 prior to impingement of the bottom of cup 30 on the shoulder at 54 which defines the margin of the larger chamber 16 with respect to the smaller chamber 14.

By applying a conventional grease supply under pressure to fitting 52, the gun is usable conventionally without using rod 24. Then, when the extreme pressure is needed, the gun is already in position to be used as described. The fitting 52 could be located to supply grease to chamber 14 even if handle magazine 50 were not present.

Having thus described my invention and the advantages thereof, I do not wish to be limited to the details herein disclosed, otherwise than as set forth in the claim, but what I claim is:

1. An ultrahigh pressure grease gun comprising a barrel, means forming two axially aligned cylindrical chambers therein of unequal diameters, a reciprocatory plunger in the chamber of smaller diameter, said plunger having a portion extending into the chamber of larger diameter, the chambers having opposite open ends and the plunger expressing grease from the smaller chamber upon reciprocatory motion toward the opening thereof, said chamber of smaller diameter having a relatively great length, a passage thereinto adjacent the chamber of greater diameter, a grease holder on the barrel in position to supply grease through the passage to the portion of the smaller chamber in advance of the plunger when the latter is retracted.

internal threads associated with the chamber of larger diameter at its open end, a threaded rod in mesh therewith, a relatively rotatable connection between the rod and the plunger, and a turning head on the rod external of the chamber, the diameter of the rod being in excess of the diameter of the plunger, the plunger being actuated only by the threaded rod and the internal threads for advancing substantially the entire length of the cylindrical chamber of smaller diameter, the plunger having a close fit with the chamber of smaller diameter in the nature of a piston, said connection including a concave tip and a mating convex head between the threaded rod and the plunger, and means for holding the same together in generally loosely mating relationship.

References Cited

UNITED STATES PATENTS

| Re. 26,180 | 4/1967 | Frenzel et al. | 222—390 X |
| 1,751,114 | 3/1930 | Walstrom | 222—390 X |
| 2,038,762 | 4/1936 | Rotter | 222—261 |
| 2,094,423 | 9/1937 | Bernhardt | 222—385 X |
| 2,407,208 | 9/1946 | Sherwood | 222—390 |
| 2,557,374 | 6/1951 | Cripe | 222—260 |

FOREIGN PATENTS

| 250,691 | 4/1926 | Great Britain. |

ROBERT B. REEVES, *Primary Examiner.*

HADD S. LANE, *Examiner.*